United States Patent [19]

Osawa

[11] Patent Number: 4,472,003
[45] Date of Patent: Sep. 18, 1984

[54] TRACK GUIDE BEARING ASSEMBLY

[75] Inventor: Nobuyuki Osawa, Takasaki, Japan

[73] Assignee: Nippon Seiko K. K., Tokyo, Japan

[21] Appl. No.: 481,633

[22] Filed: Apr. 4, 1983

[30] Foreign Application Priority Data

Apr. 14, 1982 [JP] Japan ................................ 57-53136

[51] Int. Cl.$^3$ ............................................. F16C 29/06
[52] U.S. Cl. ..................................................... 308/6 C
[58] Field of Search ............... 308/6 C, 6 R, 6 A, 196

[56] References Cited

U.S. PATENT DOCUMENTS

| 4,181,375 | 1/1980 | Ernst et al. | 308/6 C |
| 4,390,215 | 6/1983 | Mottate | 308/6 C |
| 4,426,119 | 1/1984 | Mottate | 308/6 C |
| 4,433,876 | 2/1984 | Mottate | 308/6 C |

Primary Examiner—Lenard A. Footland

Attorney, Agent, or Firm—Wyatt, Gerber, Shoup, Scubey & Badie

[57] ABSTRACT

A track guide bearing assembly is provided with a slide table having a plurality of axial ball rolling grooves and an axial through-bore providing ball paths formed rearwardly of the ball rolling grooves, side plates fixed to the opposite end surfaces of the slide table and havng arcuate ball paths formed as recesses, the arcuate ball paths having narrow escape grooves at the bottom thereof, a number of balls rollably disposed in the ball rolling grooves of the slide table, the through-bore and the arcuate ball paths of the side plates, a retainer comprising a wire rod having a straight portion and arcuate bent portion at the opposite ends of the straight portion, and an elongate track shaft having axial ball rolling grooves fitted to the balls disposed in the ball rolling grooves of the slide table.

11 Claims, 6 Drawing Figures

TRACK GUIDE BEARING ASSEMBLY

BACKGROUND OF THE INVENTION

1. Field of the Invention

This invention relates to improvements in a track guide bearing assembly wherein a number of balls are disposed between an axial ball rolling groove provided in a track shaft and an axial ball rolling groove provided in a slide table, and these balls can circulate along a ball circulating path provided in the slide table.

2. Description of the Prior Art

Such a track guide bearing assembly has a great load capacity because the balls are adapted to roll while fitting in an axial concave groove, and has the advantage that the slide table can be moved easily through a rather large distance because the balls circulate, and thus such an assembly has often been used as the guide element of a machine tool, a measuring instrument or the like.

However, the track guide bearing assemblies according to the prior art have been of such a construction that the circulation of balls may not always be as smooth as desired, or the number of steps in working or assembling the various parts may be rather great.

That is, many of the track guide bearings according of the prior art, as shown for example in FIG. 4 of the accompanying drawings, have suffered from the disadvantage that the balls 5 fitted in the ball rolling groove 2 of a track shaft 1 and the ball rolling groove 4 of a slide table 3 must be directed into an arcuate ball path 7 formed in a side plate 6 to circulate the balls 5. In order to direct the balls in this circulating path 7, a tongue 9 formed in a retainer 8 is bent so as to become proximate to the ball rolling groove 2 and therefore the balls 5 strike against the tongue 9 of the retainer during their travel end may not circulate smoothly.

Another type of track guide bearings shown in FIG. 5 of the accompanying drawings has a projection 19 adapted to extend into the ball rolling groove 2 of a track shaft 1 is formed on a portion of a side plate 16, and again in this track guide bearing, as in the track guide bearing of FIG. 4, the balls 5 may strike against a corner of the projection 19 and, therefore, the circulation of the balls entering an arcuate ball path 17 may not always be smooth.

In a track guide bearing shown in FIG. 6 of the accompanying drawings, the circulation of the balls of the above-described prior art track guide bearings has been improved. In this track guide bearing, balls 5 fitting in the ball rolling groove 4 of a slide bed 3 are retained by a sheet-like retainer 18 extending over the outside of the balls over the length of the groove 4, and an escape groove 20 for receiving the retainer 18 is formed at the bottom of the groove 12 of a track is formed in the ball rolling groove 12 of a track shaft 11. The end of this retainer 18 is formed into an arcuate portion having the same radius as the arc of the arcuate ball circulating path 27 of a side plate 26 and the retainer 18 is fixed to the side plate 26 by a pin 21 fitted in a square groove formed in the side plate 26.

The track guide bearing of FIG. 6 has the advantage that the balls 5 smoothly circulate while being guided by the retainer 18 as they enter the circulating path 27. However, this track guide bearing has suffered from the disadvantage that the retainer thereof is high in working cost and the attachment thereof to the side plate is cumbersome.

SUMMARY OF THE INVENTION

It is an object of the present invention to provide a track guide bearing assembly which eliminates the above-noted disadvantages peculiar to the track guide bearings of the prior art.

To achieve such object, the present invention uses as a retainer a wire rod having a straight portion in the intermediate part and arcuate bent portions at the opposite ends, and escape grooves engaging the arcuate bent portions of the retainer are provided at the groove bottom of the arcuate ball paths of side plates and the retainer comprising the wire rod is retained in the escape grooves.

DESCRIPTION OF THE PREFERRED EMBODIMENT

Figure 1:
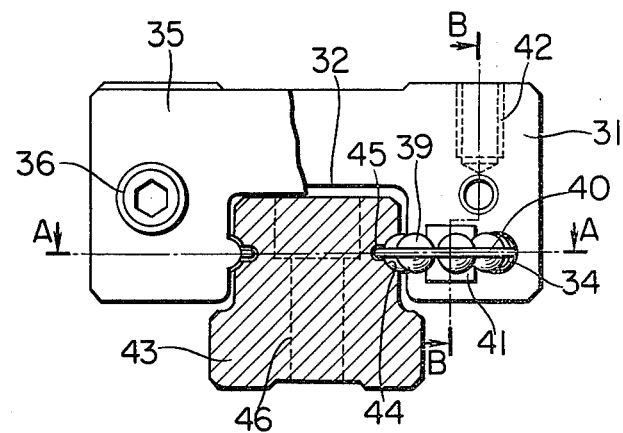
FIG. 1 is a front view including a longitudinal cross section of the track guide bearing assembly according to the present invention with a side plate 35 being broken away substantially in the central portion thereof and the right-hand side thereof being removed.
Figure 2:
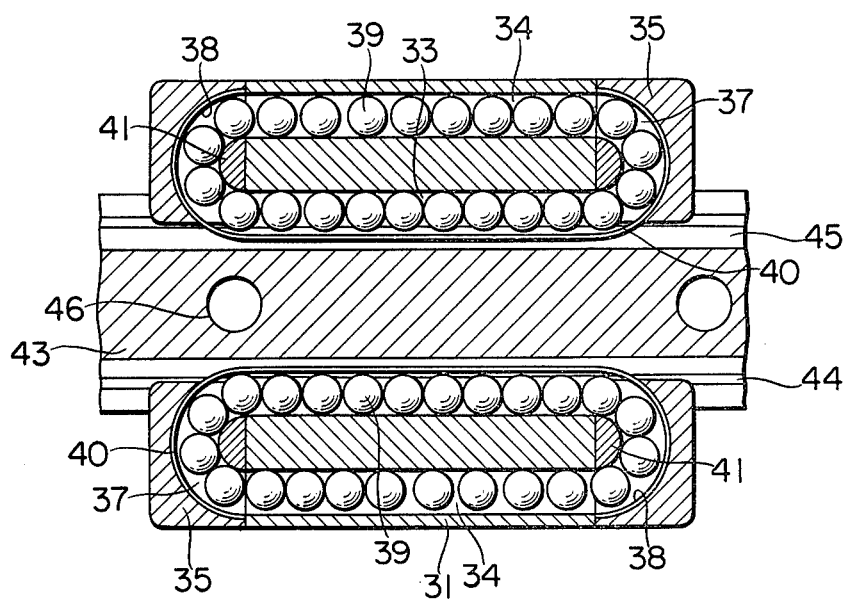
FIG. 2 is a transverse cross-sectional view taken along line A—A of FIG. 1.
Figure 3:
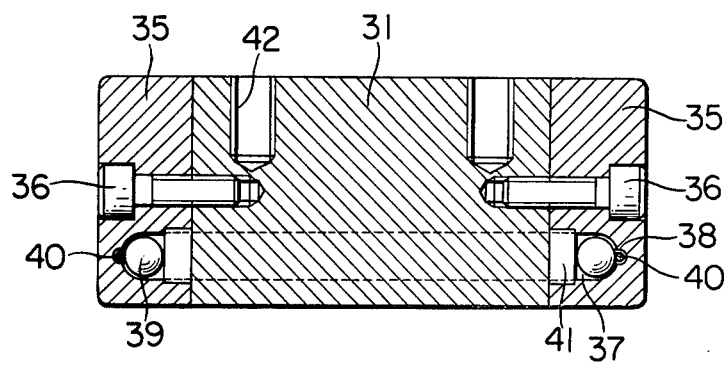
FIG. 3 is a transverse cross-sectional view taken along line B—B of FIG. 1.
Figure 4:
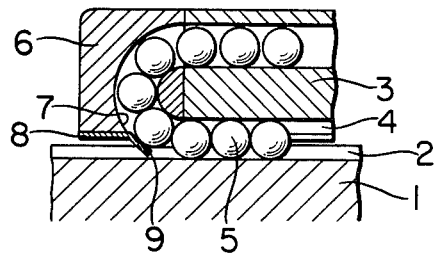
FIGS. 4 to 6 are fragmentary cross-sectional views of the track guide bearings according to the prior art.
Figure 5:
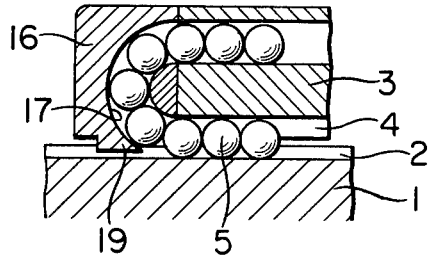
Figure 6:
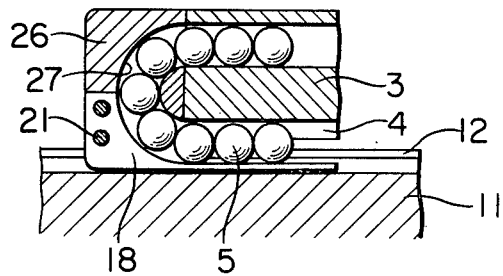

An embodiment of the track guide bearing assembly according to the present invention will hereinafter be described with reference to FIGS. 1 to 3.

A slide table 31 has an axial recess 32, the inner surface of which is formed with a plurality of axial ball rolling grooves 33, and an axial through-bore 34 which provides a ball path and is formed rearwardly of each ball rolling groove 33.

Side plates 35 are secured to the opposite end surfaces of the slide table 31 by bolts 36, and an arcuate ball path 37 connecting the ball rolling groove 33 and the through-bore 34 of the slide table is formed. A recess in each of the side plates 35, and a narrow escape groove 38 is formed at the groove bottom of each arcuate ball path 37.

A number of balls 39 are rollably disposed in the ball rolling grooves 33 and through bores 34 of the slide table and in the arcuate ball paths 37 of the side plates.

Retainers 40 are provided to prevent the balls 39 from falling from the ball rolling grooves 33 of the slide table. Each retainer 40 comprising a wire rod having a straight portion substantially equal to the length of the ball rolling grooves 33 in the slide table 31, and arcuate bent portions at the opposite ends of the straight portion. The retainer 40 is held with its arcuate bent portions engaged with the respective escape grooves 38 of the side plates, and the straight portion of each retainer 40 is in proximity to the balls 39 fitted in the respective ball rolling grooves 33.

Semicircular members 41 are attached to the slide table 31 and radially spaced toward inside from the respective escape grooves of the side plates so that the balls 39 disposed in the respective arcuate ball paths 37 may be guided. A threaded hole 42 is a bolt mounting hole used to mount other member onto the slide table 31.

An elongate track shaft 43 has on the opposite sides thereof axial ball rolling grooves 44 corresponding to the ball rolling grooves 33 of the slide table 31, and a narrow axial escape groove 45 is formed at the bottom of each of the ball rolling grooves 44.

The balls 39 disposed in the ball rolling grooves 33 of the slide table fit in the corresponding ball rolling grooves 44 of the track shaft. Each retainer 40 fixed to the slide table 31 has its straight portion positioned without being restrained in the escape groove 45 formed at the bottom of each of the ball rolling grooves 44 of the track shaft.

The ball rolling grooves 44 of the track shaft and the ball rolling grooves 33 of the slide table are in the form of a Gothic arch in cross-section, and the balls 39 fitting in these ball rolling grooves 33 and 44 are of a diameter which can provide a slight pre-pressure and therefore, the balls 39 are in four-point-contact and thus can support any load in vertical and horizontal directions.

When the slide table 31 moves axially, the balls 39 are guided by the retainer 40 at an end portion of the slide table 31 and smoothly enter the arcuate ball path 37 and pass through the through-bore 34 into the arcuate ball path 37 on the opposite side and again move therefrom into the ball rolling grooves 33, 44 between the slide table 31 and the track shaft 43, thus circulating.

The assembly of this track guide bearing may be accomplished as follows. First, the pieces 41 are fitted into the recess of the respective side plate 35, and then the side plates 35 are fixed to the end surfaces of the slide table 31 by bolts 36. At this time, the arcuate bent portions of each retainer 40 are fitted into the corresponding escape grooves 38 formed in the arcuate ball paths 37 of the side plates. The balls 39 can be easily incorporated from inside by laterally resiliently deforming the straight portion of each retainer 40.

Holes 46 formed in the track shaft 43 are bolt-receiving holes used to mount the track shaft 43 to other member.

The retainer 40 in this embodiment may be a wire rod of circular, square or half round cross section, but piano wire of circular cross section is convenient to utilize.

Each side plate 35 should desirably be fabricated by molding a synthetic resin material because it is of such a configuration that the arcuate ball path 37 in which the escape groove 38 is formed opens in one direction.

In the track guide bearing of the present invention constructed as described above, the retainer comprises a wire rod having arcuate bent portions at the opposite ends thereof and, therefore, the retainer can be fabricated at low cost, and the bearing is inexpensive and easy to assemble because the side plates holding the retainer are only provided with narrow escape grooves at the groove bottom of the arcuate ball paths. Thus, the present invention can provide at low cost a track guide bearing in which the balls are guided and circulated smoothly by the retainer.

Also, this track guide bearing permits readily available and inexpensive piano wire of high strength to be used as the wire rod of the retainer, and this wire rod guides the balls over the full length of the arcuate ball path of the side plates and therefore, this track guide bearing is well durable irrespective of the material of the side plates.

I claim:

1. A track guide bearing assembly for a a slide table having a plurality of axial ball rolling grooves in the inner surface thereof and an axial bore providing a ball path formed rearwardly of said ball rolling grooves, side plates fixed to the opposite end surfaces of said slide table and having arcuate ball paths formed as recesses, said arcuate ball paths connecting said ball rolling grooves of said ball slide table and the bores corresponding to said ball rolling grooves, said arcuate ball paths having narrow escape grooves at the bottom thereof, a number of balls rollably disposed in said ball rolling grooves of said slide table, said bore and said arcuate ball paths of said side plates, a retainer comprising an elongated member having a straight portion and arcuate bent portions at the opposite ends of said straight portion, said arcuate bent portions being engaged with said escape grooves formed in said ball paths of said side plates, said retainer being in proximity to said balls disposed in said ball rolling grooves of said slide table to hold said balls, and an elongate track shaft having axial ball rolling grooves fitted to the balls disposed in said ball rolling grooves of said slide table, whereby said slide table is axially movable on said track shaft through the rolling of said balls and, during relative movement of said slide table and said track shaft, said balls are movable while being guided by said retainer.

2. A track guide bearing assembly according to claim 1, wherein the elongated member is a wire rod.

3. A track guide bearing assembly according to claim 2, wherein said elongated member is formed from piano wire.

4. A track guide assembly according to claim 1, said elongated member is formed from piano wire.

5. A track guide assembly according to claim 1, said side plates being formed of a synethic resin material.

6. A bearing assembly for a track guide for a device, including recesses formed in each of mating surfaces of said track guide and said device, a respective bore formed in one of said track guide or device at a position along the recesses thereof, a plurality of balls fitted within said mating recesses and said bores, and means for connecting said mating recesses with a respective bore for recirculating said balls smoothly therewithin, said means including respective side plates having arcuate paths connecting said mating recesses with the associated bore and a retainer comprised of an elongate member having a straight portion extending along said mating recesses to hold said balls therein and arcuate portions extending into said arcuate paths for directing said balls smoothly thereinto.

7. A bearing assembly according to claim 6, said mating recess of said track guide having an escape groove formed therein for receiving the straight portion of said retainer.

8. A bearing assembly according to claim 6, said arcuate paths having an escape groove formed therein for receiving the arcuate portion of said retainer.

9. A bearing assembly according to claim 6, wherein said retainer is a wire rod.

10. A bearing assembly according to claim 9, wherein said wire rod is formed of piano wire.

11. A bearing assembly according to claim 6, said side plates being formed of a synthetic resin material.

* * * * *